United States Patent [19]
Keshi et al.

[11] 4,032,574
[45] June 28, 1977

[54] PRODUCTION OF POLYETHERPOLYOLS USEFUL IN PREPARING RIGID POLYURETHANE FOAMS

[75] Inventors: Akizo Keshi, Takatsuki; Katsuhisa Kodama, Nishinomiya; Ichiro Takemura, Takatsuki; Yoshihiko Tairaka, Sakai; Kunio Yoshinaga, Ikeda, all of Japan

[73] Assignee: Takeda Chemical Industries, Ltd., Osaka, Japan

[22] Filed: Sept. 25, 1975

[21] Appl. No.: 616,898

[30] Foreign Application Priority Data

Oct. 7, 1974 Japan .......................... 49-115799

[52] U.S. Cl. .................. 260/570 D; 260/563 R; 260/570.6; 260/573; 260/584 B
[51] Int. Cl.² ................. C07C 93/04; C07C 93/06; C07C 93/08; C07C 93/12
[58] Field of Search .......... 260/578, 570 D, 583 P, 260/563 R, 453 AR, 453 AM, 453 AL, 584 B, 570.6

[56] References Cited

UNITED STATES PATENTS

| | | | |
|---|---|---|---|
| 2,999,873 | 9/1961 | Bloom et al. ................... | 260/453 |
| 3,128,310 | 4/1964 | Koch ............................... | 260/582 |
| 3,225,094 | 12/1965 | Wolf ............................... | 260/570 |
| 3,415,891 | 12/1968 | Turumaru et al. ............. | 260/583 P X |
| 3,499,009 | 3/1970 | Odinak et al. ................. | 260/570 |

FOREIGN PATENTS OR APPLICATIONS

| | | | |
|---|---|---|---|
| 1,047,101 | 11/1966 | United Kingdom ............ | 260/570 |
| 1,047,116 | 11/1966 | United Kingdom ............ | 260/570 |
| 972,772 | 10/1964 | United Kingdom ............ | 260/570 |

OTHER PUBLICATIONS

Sidgwick, "The Organic Chemistry of Nitrogen", p. 236, (1966).

*Primary Examiner*—Daniel E. Wyman
*Assistant Examiner*—John J. Doll
*Attorney, Agent, or Firm*—Wenderoth, Lind & Ponack

[57] ABSTRACT

Polyetherpolyols useful in preparing rigid polyurethane foam excellent in dimensional stability and inflammability. These polyetherpolyols are obtained by reacting alkylene oxide with compounds containing active hydrogen atoms, part or all of which comprise the reaction product obtained by heating the distillation residue secured as a byproduct in the distillation process of a crude polyisocyanate in the presence of (1) water, alcohols and/or amines and (2) hydroxides or oxides of alkali metals or alkaline earth metals and/or monoalkanolamines.

10 Claims, No Drawings

PRODUCTION OF POLYETHERPOLYOLS USEFUL IN PREPARING RIGID POLYURETHANE FOAMS

This invention relates to a method for the production of novel polyetherpolyols.

More particularly, the invention relates to a method for the production of polyetherpolyols by the reaction of compounds containing active hydrogen atoms with an alkylene oxide characterized in that said method comprises employing, as part or all of said compounds containing active hydrogen atoms, the reaction product obtained by heating the distillation residue secured as a byproduct in the distillation process of a crude organic polyisocyanate produced by phosgenation of the corresponding organic polyamine in the presence of (1) water, alcohols and/or amines and (2) the hydroxides or oxides of alkali metals or alkaline earth metals and/or monoalkanolamines.

Organic polyisocyanates, which are raw materials for polyurethane foams, elastomers and coatings, for instance, are commercially manufactured by reacting the corresponding organic polyamines with phosgene. Those polyisocyanates are usually purified by distillation. In this distillative refining process, a byproduct known as the distillation residue is produced in a proportion of 10 and odd percent and, in the case of certain types of polyisocyanates, more than 20 percent based on the weight of the purified polyisocyanate.

Such distillation residues of polyisocyanates have found no application, usually being disposed of by dumping or incineration as industrial refuse. However, with the remarkable progress of the polyurethane industry in recent years, which has been accompanied by the increased production of organic polyisocyanates, the disposal of byproduct distillation residues of polyisocyanates has become a serious problem. That is, dumping and incineration of such a distillation residue of polyisocyanates could cause environmental pollution and other social problems.

Such an organic polyisocyanate distillation residue is presumed to be a mixture of various compounds formed as two or more molecules undergo polycondensation in the polyisocyanante production processes, that is to say, in the course of phosgenation of organic polyamines and in the course of distillation of polyisocyanates, although the chemical structures of the individual compounds are unknown.

An object of this invention is to provide a method for effective utilization of the distillation residue obtained as a byproduct in the production of polyisocyanates.

Thus, this invention relates to a method for producing a polyetherpolyol through the reaction of an active hydrogen containing material with an alkylene oxide. This said method is characterized in that it comprises employing the reaction product obtained by heating the distillation residue secured as a byproduct in the production of an organic polyisocyanate in the presence of (1) at least one member of water, alcohols and amines and (2) at least one member of the hydroxides and oxides of alkali and alkaline earth metals and alkanolamines.

As the distillation residues of crude organic polyisocyanates to be employed according to this invention, there may be mentioned the distillation residues obtained in the distillation process of such polyisocyanates as aromatic diisocyanates, e.g. 2,4-tolylene diisocyanate, tolylene diisocyanate (2,4-isomer/2,6-isomer=63/35), tolylene diisocyanate (2,4-isomer/2,6-isomer=80/20), 2,6-tolylene diisocyanate, 1,3-phenylene diisocyanate, 1,4-phenylene diisocyanate, 1,3-dimethylbenzole 2,4-diisocyanate, 1,3'-dimethylbenzol 4,6-diisocyanate, 1,4-dimethylbenzole 2,5-diisocyanate, 1-ethylbenzole 2,4-diisocyanate, 1-isopropylbenzole 2,4-diisocyanate, diisopropylbenzole diisocyanate, naphthalene 1,4-diisocyanate, naphthalene 1,5-diisocyanate, naphthalene 2,6-diisocyanate, naphthalene 2,7-diisocyanate, 1,1'-dinaphthyl 2,2'-diisocyanate, biphenyl 2,4'-diisocyanate, biphenyl 4,4'-diisocyanate, 3,3'-dimethylbiphenyl 4,4'-diisocyanate, 3,3'-dimethoxybiphenyl 4,4'-diisocyanate, 2-nitrobiphenyl 4,4'-diisocyanate, diphenylmethane 4,4'-diisocyanate, 2,2'-dimethyldiphenylmethane 4,4'-diisocyanate, diphenyldimethylmethane 4,4'-diisocyanate, 3,3'-dimethoxydiphenylmethane 4,4'-diisocyanate, 4,4'-dimethoxyphenylmethane 3,3'-diisocyanate, 3,3'-dichlorodiphenyldimethylmethane 4,4'-diisocyanate, etc.; aliphatic diisocyanates, e.g. ethane diisocyanate, propane diisocyanate, butane diisocyanate, hexane diisocyanate, 2,2-dimethylpentane diisocyanate, octane diisocyanate, 2,2,4-trimethylpentane diisocyanate, decane diisocyanate, etc.; alicyclic diisocyanates, e.g. $\omega,\omega'$-diisocyanato-1,3-dimethylbenzole, $\omega,\omega'$-diisocyanato-1,4-dimethylbenzole, $\omega,\omega'$-diisocyanato-1,2-dimethylcyclohexane $\omega,\omega'$-diisocyanato-1,4-diioscyanato-1,4-diethylbenzole, $\omega,\omega'$-diisocyanato-1,4-dimethylnaphthalene etc.; and triisocyanates, e.g. 1-methylbenzole 2,4,6-triisocyanate, 1,3,5-trimethylbenzole 2,4,6-triisocyanate, naphthalene 1,3,7-triisocyanate, biphenyl 2,4,4'-triisocyanate, diphenylmethane 2,4,4'-triisocyanate, triphenylmethane4,4',4'-triisocyanate and so on.

The distillation residues usually contain no more than 30 % by weight of polyisocyanate monomers. The distillation residues obtainable in the course of industrial production of a polyisocyanate generally contain 10 to 20 % by weight of the polyisocyanate monomer. Among such polyisocyanate distillation residues, the distillation residues of diisocyanates such as 2,4-tolylene diisocyanate, 2,6-tolylene diisocyanate, mixtures thereof, diphenylmethane 4,4'-diisocyanate, $\omega, \omega'$-dimethylbenzenediisocyanate and so on are conveniently employed in this invention.

As the alcohols designated as (1) in this invention, there may, for example, be mentioned aliphaticmono- or polyhydric alcohols of 1 to 10 carbons such as monohydric alcohols e.g. methanol, ethanol, isopropyl alcohol, n-butanol, 2-ethylhexyl alcohol, 1-octanol, methyl cellosolve, ethyl cellosolve, carbitol, etc.; dihydric alcohols e.g. ethylene glycol, propylene glycol, 1,4-butane glycol, 1,3-butane glycol, 1,5-pentane glycol, neopentyl glycol, 1,6-hexane glycol, 1,10-decane glycol, diethylene glycol, dipropylene glycol, triethylene glycol, tripropylene glycol, tetraethylene glycol, etc.; trihydric alcohols e.g. glycerine, trimethylolpropane, 1,2,6-hexanetriol, etc.; and tetrahydric alcohols e.g. pentaerythritol, diglycerine and so on. These alcohols may be used alone or in combination.

It is also preferable to use these alcohols in admixture with water.

Among such alcohols, monohydric alcohols such as 1- butanol, methyl cellosolve, carbitol, etc. and dihydric alcohols such as ethylene glycol are particularly beneficial.

As the aforesaid amines, there may be mentioned straight or blanched aliphatic amines having 2 to 9 carbon atoms such as di-n-butylamine, ethylenediamine, tetramethylenediamine, hexamethylenediamine, n-hexylamine, 2-ethylhexylamine, triethylamine, n-propylamine, di-n-propylamine, tri-n-propylamine, n-amylamine, N,N-dimethylethanolamine, isobutylamine, isoamylamine, methyldiethylamine, etc.; alkanolamine having 1 to 6 carbon atoms such as monoethanolamine, diethanolamine, triethanolamine isopropanolamine, etc.; alicyclic amines having 5 to 6 carbon atoms such as cyclopentylamine, cyclohexylamine, etc.; aromatic amines having 6 to 10 carbon atoms such as aniline, methylaniline, dimethylaniline, diethylaniline, ortho-, meta- and para-toluidines, benzylamine, dimethyl-benzylamine, diethylbenzylamine, ortho-, meta- and para-nisidines, ortho-, meta- and para-chloroanilines, para-phenetidine, ortho-phenylenediamine, α-naphthylamine and so on.; heterocyclic amines such as pyridine, αβ-picoline, N-methylmorpholine, N-ethylmorpholine, pyrazole, morpholine, piperazine, piperidine, etc.; and such diamines as meta- and ortho-tolylenediamines, and so on. These amines may be employed alone or in combination.

The members designated as (1) herein primarily act as a diluent for the distillation residues.

The hydroxides and oxides of alkali metals or alkaline earth metals, designated as (2) in this invention, include, among others, lithium hydroxide, sodium hydroxide, potassium hydroxide, magnesium hydroxide, calcium hydroxide, lithium oxide, magnesium oxide, calcium oxide, barium oxide and so on. These compounds may also be used alone or in combination.

As the monoalkanolamines, also designated as (2), there may be mentioned those having 2 to 4 carbon atoms such as monoethanolamine, mono-n-propanolamine, monoisopropanolamine and so on. As excess of monoalkanolamine may be used so that it will act also as member (1).

The members designated as (2) are chiefly used as agents for decomposing the isocyanate distillation residues.

The following description pertains to the embodiment of this invention wherein the hydroxide or oxide of an alkali metal or alkaline earth metal is employed as member (2). The reaction if conducted at atmospheric or superatmospheric pressure of not more than 10 atmospheric pressure. Prior to this reaction, the distillation residue of organic polyisocyanate, when it is solid, is preferably crushed to a suitable size. The proportions of member (1) and polyisocyanate distillation residue depend upon the type of (1) and the type of organic polyisocyanate residue but ordinarily the ratio is about 3/1 to 1/3 by weight, preferably about 2/1 to 1/1 by weight.

As to the proportion of member (2), while it varies with the types of members (1) and (2) and the type and amount of organic polyisocyanate residue, it is usually desirable to employ about 30 to 150 weight %, preferably about 70 to 100 weight %.

The reaction temperature is usually within the range of about 50° to 250° C, preferably about 100° 8c to 200° C and the reaction time is about 30 minutes to 5 hours, although these depend on the types and amounts of members (1) and (2) and the type of organic polyisocyanate residue.

When the degradation reaction product thus obtained contains the carbonate of alkali metal or alkaline earth metal, this contaminant is preferably removed by a suitable procedure such as filtration.

It is also possible to recover the decomposition solvent member (1) from the reaction mixture by a procedure such as distillation. When the member designated as (1) is a compound containing two to four hydroxyl groups or an alkanolamine, it is not always essential to recover it completely. There also are cases in which such as a compound containing two to four hydroxyl groups or an alkanolamine, by way of a decomposing agent, is left unremoved either wholly or partially from the mixture. In such cases, the degradation product can be employed as a reaction initiator for the production of polyethers.

The following description pertains to the embodiment of this invention wherein a monoalkanolamine is employed as member (2). Since the monoalkanolamine thus employed can act also as member (1), it is generally unnecessary to employ any member (1). The proportion of monoalkanolamine, as members (1) and (2), is 0.2 to 5.0 parts, preferably 0.5 to 2.0 parts, based on every part of distillation residue. With a lesser amount of monoalkanolamine, the distillation residue is not completely decomposed and, in many instances, the degradation product will be solid. With an excess of monoalkanolamine, the degradation product will be low in viscosity but the polyurethane foam obtained from a polyether produced using it as the reaction initiator will generally be lacking in physical properties and is, thus in many instances, of no practical utility value.

The reaction temperature is in the range of 100° to 250° C, preferably from 120° to 200° C. The time necessary for degradation is 30 minutes to 5 hours, depending upon the type of organic polyisocyanate residue and the type and amount of monoalkanolamine used.

The degradation product thus obtained contains the polyamine produced on decomposition of the organic polyisocyanate residue, the amino-containing polymers formed on partial decomposition of the organic polyisocyanate residue with the monoalkanolamine, the monoalkanolamine, the oxazolidones produced from the monoalkanolamine, and the imidazolidone compounds formed by condensation of said oxazolidones with the monoalkanolamine or said polyamines.

With or without the addition of one or more other active hydrogen-containing compounds, the reaction product thus obtained is subjected to addition polymerization with an alkylene oxide to obtain a hydrox-terminated polyetherpolyol.

As the other active hydrogen-containing compounds, there may be mentioned polyols having 2 to 8 hydroxyl groups and 2 to 12 carbon atoms, amines having two or more active hydrogen atoms, alkanolamines of 2 to 4 carbon atoms, and the polyether polyols with hydroxyl numbers of 800 to 300 mg. KOH/g. which are obtainable by the addition polymerization of said compounds with alkylene oxides. Among specific examples of such active hydrogen compounds are dihydric alcohols of 2 to 9 carbon atoms such as ethylene glycols, propylene glycol, 1,4-butane glycol, 1,3-butane glycol, neopentyl glycol, 1,6-hexane glycol, diethylene glycol, dipropylene glycol, triethylene glycol, tripropylene glycol, etc.; trihydric alcohols of 3 to 6 carbon atoms such as glycerine, trimethylolpropane, 1,2,6-hexanetriol, etc.; tetrahydric alcohols such as pentaerythritol, diglycerine, α-methylglucoside, etc.; pentahydric alcohols such as xylitol, etc.; hexahydric alcohols such as sorbitol, octahydric alcohols such as sucrose, etc.; aliphatic diamines of 2 to 6 carbon atoms such as ethylenediamine, butanediamine, hexanediamine, etc.; aromatic diamines such as meta and ortho-tolylenediamines, napthylenediamine, xylylenediamine, 4,4'-methylene-bisaniline, etc.; triamines such as diethylenetriamine, etc.; polyamines obtainable on condensation of aniline with formmaldehyde; s-triazine compounds such as acetoguanamine, benzoguanamine, melamine, etc.; alkanolamines such as diethanolamine, triethanolamine, diisopropanolamine, tripropanolamine, etc.; and so on. Use may also be made of polyetherpolyols with hydroxyl numbers from 800 to 300 mg. KOH/g. and molecular weight of 120 to 3,000 which are obtainable by addition of an alkylene oxide, e.g. ethylene oxide, propylene oxide or the like, to one or more of the aforementioned active hydrogen compounds. The proportion of said other active hydrogen compound relative to the degradation product of organic polyisocyanate may be selected from the range of 0 to 200 percent by weight based on the latter degradation product. These active hydrogen compounds may be present when the organic polyisocyanate distillation residue is decomposed.

As the alkylene oxide employed in this invention, there may be mentioned ethylene oxide, propylene oxide, butylene oxide, styrene oxide, allylglycidylether, phenylglycidylether and so on. Among these compounds, ethylene oxide and propylene oxide are particularly advantageous. Of course, two or more different alkylene oxides may be employed in combination. The addition of such alkylene oxides can be accomplished according to per se known reaction conditions as described in "High Polymers Vol. XIII Polyethers Part I" (1963), Interscience Publishers. For example, the addition can be conducted at 70° to 150° C, preferably 90° to 130° C, and at atmospheric or elevated pressure.

In the additional reaction of alkyleneoxide, alkali hydroxide, e.g. sodium hydroxide, potassium hydroxide or the like, and or tertiary amines such as triethylamine may, for instance, be used as a catalyst. Such a catalyst need not necessarily be added at the commencement of the reaction but may be added in the course of reaction. The proportion of such an alkali hydroxide catalyst is 0.01 to 10 percent, preferably 0.1 to 5 percent, based on the weight of the reaction initiator. After the reaction, the alkali hydroxide catalyst may be removed by a suitable procedure, for example, by neutralization with acid.

When a tertiary amine is used as the catalyst, it may be used in a proportion of about 0.1 to 3.0 weight percent.

The polyetherpolyol of this invention thus obtained can be utilized, either alone or in combination with other general polyetherpolyols or/and polyesterpolyols, as a raw material for rigid urethane foams.

When rigid polyurethane foam is produced from the polyetherpolyol thus obtained, it is reacted with organic polyisocyanate in the presence of a catalyst, blowing agent, silicon surfactant (foam regulator) and other additives according to per se known methods, for instance, as described in "High Polymers vol. XVI, Polyurethanes: Chemicstry and Technology Part I Chemistry" (1963) and "Part II Technology (1964)", Interscience Publishers.

As the organic polyisocyanate, use is made of one having an amine equivalent of 75 to 250 such as 2,4-, 2,6- tolylenediisocyanate, diphenylmethanediisocyanate, naphthylenediisocyanate, m-, p-xylylenediisocyanate, hexamethylenediisocyanate and those mentioned above as well as crude polyisocyanates therof. These polyisocyanates may be employed alone or in combination. Use may also be made of the isocyanate-terminated prepolymer obtainable by the reaction of polyisocyanate with a compound containing active hydrogen atoms, and polyisocyanate modified by the formation of allophanate group or by trimerisation of polyisocyanate.

As the catalyst, there may be mentioned amines such as triethylamine, triisopropylamine, N-ethylmorphorin, dimethylethanolamine, triethylenediamine, tetramethylpropanediamine, tetramethylhexanediamine, etc.; organic tin compounds such as stannous octoate, dibutyltindilaurate.

As the silicon surfactants, there may be mentioned silicon-polyalkyleneoxide block copolymer such as Silicon L-5320(produced by Union Carbide Corp.), Silicon F-305, 306, 317 (produced by Shinetsu Kagaku Kogyo in Japan).

As a blowing agent, there may be mentioned trichloromonofluoromethane, dichlorodifluoromethane, water, etc.

In addition, there may be used flame retardants such as trischloroethyl phosphate, tris(2,3-dibromopropyl) phosphate and fillers such as calcium carbonate, aluminium hydroxide.

The method of this invention enables us to make effective use of the distillation residues of organic polyisocyanate which, thus far, have not found application and could cause social problems such as environmental pollution. The present invention provides the polyetherpolyols with those properties desired in raw materials for rigid urethane foams.

Thus, the polyetherpolyols obtained according to this invention are basic and enable us to accomplish a significant reduction in the amount of amine-type catalyst required in the production of polyurethane foam. The rigid polyurethane foams thus prepared from such polyetherpolyols have excellent dimensional stability, inflamability and other properties.

In the following working and reference examples, the relashionship between parts by weight and parts by volume corresponds to the relationship between grams and milliliters.

EXAMPLE 1

(A) Decomposition of TDI distillation residue

A four-necked flask of 5000 parts by volume capacity, fitted with a thermometer, reflux condenser, dropping funnel and stirring rod, was charged with 1,000 parts by weight of milled tolylenediisocyanate (80/20) distillation residue containing 13 weight % of tolylenediisocyanate monomer and 1,000 parts by weight of methyl cellosolve and, then, the contents were externally heated and stirred. After the internal temperature had reached 90° C, 1,930 parts by weight of a 50 % aqueous solution of sodium hydroxide was added dropwise from said dropping funnel over a period of about 40 minutes. During this period, the internal temperature increased to 110° C.

The mixture was stirred at this temperature for 3 hours, and carbon dioxide gas was bubbled through it to neutralize the unreacted sodium hydroxide. The resultant sodium carbonate, a white powder, was filtered off and, from the residual solution, the water and a portion of the methyl cellosolve were recovered by atmospheric distillation in the first place. Then, under reduced pressure (120 mmHg, 51° -4° C), the residual methyl cellosolve was distilled off to obtain 795 parts by weight of a black viscous fluid having active hydrogen atoms corresponding to OH No. 1245.

(B) Production of a polyetherpolyol

A four-necked flask with a capacity of 5000 parts by volume, equipped with a thermometer, reflux condenser, ethylene oxide-propylene oxide inlet pipings and stirring rod, was charged with 687 parts by weight of the alkali degradation product of toluylene diisocyanate distillation residue obtained in (A), and externally heated. At 110° C, the introduction of ethylene oxide was started under stirring. The introduction was continued at a temperature of 110±5° C for about 4 hours, at the end of which time the weight of the contents was 1090 parts by weight. In this reaction mixture were dissolved 10 parts by weight flakes of 91 % potassium hydroxide. Then, at 110° C, propylene oxide was introduced over a period of 11 hours. The contents then weighed 2250 parts by weight. The unreacted propylene oxide was removed by stirring with nitrogen gas and, then, the potassium hydroxide was neutralized with 8.6 parts by weight of oxalic acid. The resultant crystals were filtered off and nitrogen gas was introduced at 120° C for 2 hours, whereby the moisture was removed. The procedure provided 2200 parts by weight of a blackish brown, viscous polyether polyol. Analyses of this product: hydroxy number 389 mg. KOH/g.; viscosity 67,000 centipoises (25° C); moisture content 0.03%.

EXAMPLE 2

(A) Degradation of the tolylene diisocyanate distillation residue

A setup similar to that used in Example 1 A) was charged with 1000 parts by weight of a milled of tolylene diisocyanate distillation residue containing 13 weight % of tolylenediisocyanate monomer and 1030 parts by weight of diethylene glycol. Then, with stirring, a 50 % aqueous solution of sodium hydroxide was added dropwise over a period of 30 minutes. During this time, the internal temperature reached 112° C. The reaction system was further heated externally and stirred at 115° -120° C for 3 hours, after which carbon dioxide gas was bubbled through the mixture to neutralize the unreacted sodium hydroxide. The water was distillation off at atmospheric pressure and the residue was diluted with 1000 parts by weight of methanol. The resultant crystals were removed by filtration and the methanol was removed from the filtrate. The procedure provided 1758 parts by weight of a black liquid which has active hydrogen atoms corresponding to OH No. 1205.

(B) Production of a polyetherpolyol

A reaction setup similar to that used in Example 1 (B) was charged with 1600 parts by weight of the degradation product obtained in (A) above and 32 parts by weight of potassium hydroxide flakes. The potassium hydroxide was dissolved by external heating. At 110°–120° C, 870 parts by weight of ethylene oxide and, then 2640 parts by weight of proylene oxide were addition-polymerized over a period of 18 hours. After the reaction had been completed, nitrogen gas was introduced at 110° C for 30 minutes to remove the unreacted propylene oxide. Then, the potassium hydroxide was neutralized with 35 parts by weight of oxalic acid and the resultant crystals were filtered off. Finally, nitrogen gas was bubbled through the filtrate to remove the water, whereby 4680 parts by weight of a blackish brown polyetherpolyol was obtained. The analyses of this product showed a hydroxyl number of 388 gm KOH/g. and a viscosity of 485 centripoises (25° C).

REFERENCE EXAMPLE 1

Propyleneoxide was introduce into a mixture of sucrose and diethyleneglycol (the proportion of the former to the latter was 65 to 35 by weight) until the OH No. was reached to 400. The polyetherpolyol thus obtained was defined as "Control polyether 1".

Rigid polyurethane foams were manufactured using the polyether polyols obtained in Examples 1 and 2 and Control polyether 1. The formulation for foaming and the physical properties of the foams are given in Table 1. The foaming conditions are as follows.

Foaming scale: 1.5 times ($20^3$ cm$^3$-cake box foaming)
Temperature of raw materials: 20° C
Agitator: 8-blade (80 $\phi$) turbine, 1200 r.p.m.
Time of agitation: 5 seconds
the polyethers obtained in Examples 1 and 2, when combined with crude MDI, provided rigid urethane foams which has excellent physical properties and dimensional stability and which, even without the addition of a flame retardant, were self-extinguishing.

Table 1

| Experiment No. | | C-1 | C-2 | 1 | 2 | 3 | 4 | 5 | 6 |
|---|---|---|---|---|---|---|---|---|---|
| Formulation(weight part) | | | | | | | | | |
| Control polyether 1 | | 100 | 100 | | | | | | |
| Polyether of Example 1 | | | | 100 | | 50 | 100 | | 50 |
| Polyether of Example 2 | | | | | 100 | 50 | | 100 | 50 |
| Silicon surfactant F-305*1 | | 1.5 | | 1.5 | 1.5 | 1.5 | | | |
| Silicon surfactant F-317*2 | | | 1.5 | | | | 1.5 | 1.5 | 1.5 |
| Water | | | 1.5 | | | | 1.5 | 1.5 | 1.5 |
| Mixed amine catalyst*3 | | 2.5 | 2.3 | 1.0 | 1.0 | 1.0 | 0.9 | 0.8 | 0.8 |
| Freon R-11*4 | | 36 | 28 | 28 | 28 | 36 | 28 | 24 | 25 |
| Crude MDI | | 105 | 129 | 103 | 103 | 103 | 127 | 127 | 127 |
| Reactivity (seconds) | | | | | | | | | |
| Cream time | | 15" | 11" | 14" | 10" | 10" | 11" | 9" | 7" |
| Gel time | | 70" | 68" | 68" | 55" | 63" | 70" | 71" | 72" |
| Rise time | | 105" | 110" | 95" | 90" | 95" | 113" | 110" | 150" |
| Appearance of foam | | Good | Good | Good | Good | Good | Good | Good | Good |
| Physical properties | | | | | | | | | |
| Density of foam, Kg/m$^3$ | | 30.1 | 28.5 | 29.1 | 35.8 | 29.3 | 28.0 | 30.1 | 28.3 |
| Compressive strength | (//) | 2.3 | 2.0 | 2.6 | 2.4 | 2.3 | 2.1 | 1.9 | 2.0 |
| Kg/cm$^2$ | (⊥) | 0.8 | 0.7 | 0.9 | 1.2 | 0.8 | 0.95 | 0.8 | 0.8 |
| Freiability | | 100 | 90 | 85 | 120 | 100 | 75 | 110 | 115 |
| Dimensional stability | (%) | | | | | | | | |
| −30° C × 48 hrs. | (//) | +0.5 | +0.3 | 0 | −0.1 | +0.1 | 0 | +0.2 | 0 |
| −30° C × 48 hrs. | (⊥) | −2.5 | −1.6 | −0.5 | −0.7 | −0.6 | −0.2 | −0.9 | −0.2 |

Table 1-continued

| Experiment No. | | C-1 | C-2 | 1 | 2 | 3 | 4 | 5 | 6 |
|---|---|---|---|---|---|---|---|---|---|
| 70° C × 48 hrs. | (//) | −0.7 | −0.4 | −0.1 | +0.2 | −0.2 | −0.2 | +0.1 | −0.2 |
| " | (⊥) | +4.8 | +2.3 | +0.5 | +0.6 | +0.7 | +0.2 | +0.3 | +0.2 |
| Flammability (ASTM D1692-59T) | | Burning | Burning | Self-extinguishing | Burning | Burning | Self-extinguishing | Burning | Burning |
| | | 25 cm/min. | 25 cm/min. | 24 sec. 41 mm | 18 cm/min. | 14 cm/min. | 21 sec. 40 mm | 19 cm/min. | 16 cm/min. |

*¹: Silicon surfactant (by Shin-etsu Kagaku Kogyo, K.K. in Japan)
*²: Silicone surfactant (by Shin-etsu Kagaku Kogyo, K.K. in Japan)
*³: Tetramethylhexanediamine-pentamethyldiethylene-triamine =7:3
*⁴: Trichloromonofluoromethane

EXAMPLE 3

A four-necked flask of 1000 parts of volume capacity, fitted with a stirrer, thermometer and reflux condenser, was charged with 200 parts by weight of monoethanolamine and heated externally to 70° C. To this monoethanolamine was added a total of 250 parts by weight of a milled distillation residue of diphenylmethane 4,4'-diisocyanate containing 12 % of the monomer diisocyanate in three portions over a period of 30 minutes. During this period the temperature increased to 145° C. The mixture was further heated externally at 150 to 160° C for 3 hours. The product thus obtained has active hydrogen atoms corresponding to OH No. 1070.

At 100 –110° C, ethylene oxide was introduced into the above degradation product for 6 hours. During this period 180 parts by weight of ethylene oxide reacted. Further, at 110 –120° C. propylene oxide was introduced for 14 hours and, then, the mixture was aged at the same temperature for 30 minutes. Thereafter, nitrogen gas was bubbled into the mixture to remove the unreacted propylene oxide and volatile matter. The above procedure provided 1065 parts by weight of a polyetherpolyol. Analyses: hydroxyl number 435 mg.KOH/g.; pH 10.9; viscosity 8800 cps (25° C).

EXAMPLE 4

A four-necked flask of 5000 parts by volume capacity, equipped with a stirrer set. reflux condenser and thermometer, was charged with 1000 parts by weight of monoethanolamine and, then, heated externally to 90° C with stirring. To this was added a total of 1000 parts by weight milled distillation residue of tolylene diisocyanate in five portions over a period of 30 minutes. During this period, the internal temperature was raised to 150° C by the heat of reaction as well as by external heating. After the addition of distillation residue had been completed, the mixture was further stirred at 150 –160° C for 2 hours, whereby a homogeneous solution having active hydrogen atoms corresponding to OH No. 1,380 was obtained. The setup was fitted with an alkylene oxide inlet pipe, from which ethylene oxide was introduced at 100 –110° C for 10 hours. During this period 1300 parts by weight of ethylene oxide reacted. Then, at 110° to 120° C, propylene oxide was introduced over a period of 13 hours. After the introduction of propylene oxide had been completed, the mixture was further stirred at 120° C for 1 hour, after which nitrogen gas was introduced at 120° C for 30 minutes to remove the unreacted propylene oxide and volatile matter. The procedure provided 4970 parts by weight of a blackish brown liquid polyetherpolyol.

Analyses: hydroxy number 528 mg. KOH/g.; viscosity 8700 cps. (25° C)

EXAMPLE 5

With use of a setup similar to that described in Example 3, 200 parts by weight of monoisopropanolamine and 200 parts by weight of a distillation residue of diphenylmethane 4,4'-diisocyanate containing 13 % by weight of the monomer diiosocyanate were heated together at 150 –160° C for 3 hours, with stirring, to obtain a liquid degradation product having active hydrogen atoms corresponding to OH No. 1128.

As in Example 3, propylene oxide was fed at 120 –130° C over 15 hours and the unreacted propylene oxide was then removed by stripping with nitrogen gas, whereby 860 parts by weight of a polyether was obtained. The hydroxyl number of this polyether was 503 mg. KOH/g.

EXAMPLE 6

A setup similar to that used in Example 4 was charged with 600 parts by weight of monoethanolamine and 600 parts by weight of trimethylolpropane, followed by heating to 90° C. Then, 800 parts by weight of a milled distillation residue of tolylene diisocyanate containing 13 % tolylenediisocyanates monomer was added in four divided portions over a period of 30 minutes. During this period the internal temperature increased to 145° C. The mixture was further stirred under external heating at 150°–160° C for 2 hours, whereupon it became a homogeneous solution having active hydrogen atoms corresponding to OH No. 1284.

Thereafter, as in Example 4, 1200 parts by weight of ethylene oxide and 1750 parts by weight of propylene oxide were further introduced and reacted to obtain 4920 parts by weight of a blackish brown liquid polyether.

On analysis, this polyether was found to have a hydroxyl number of 510 mg.KOH/g. and a viscosity of 5200 cps.

EXAMPLE 7

By the equipment and procedures described in Example 4, 700 parts by weight of monoethanolamine and 700 parts by weight of a distillation residue of tolylene diisocyanate containing 13 % of the diisocyanate monomer were treated to obtain 1360 parts by weight of a degradation product having active hydrogen atoms corresponding to OH No. 1330.

To this degradation product were added 1200 parts by volume of a polyether with a hydroxyl number of 530 and 3 parts by weight of triethylamine. Thereafter, as in Example 4, 810 parts by volume of ethylene oxide and 1510 parts by volume of propylene oxide were further reacted to obtain a blackish-brown liquid polyether. On analysis, this product was found to have a hydroxyl number of 497 mg. KOH/g., a pH value of 11.2 and a viscosity of 6200 cps. (25° C).

REFERENCE EXAMPLE 2

By the introduction of propyleneoxide into a mixture of sucrose and diethyleneglycol (65:35 by weight), "Control polyether 2" having OH No.530 and "Control polyether 3" having OH No.490 were obtained, respectively.

The polyethers obtained in Example 3 to 7 and Control polyethers 2 and 3 were used respectively in combination with crude MDI (C-MDI) and crude TDI to obtain rigid polyurethane foams.

The foaming formulation, reactivities and the properties of foams are shown in Table 2. The conditions of the experiment other than those set forth in the table are as follows.

Temperature of the raw materials: 20 ± 1420 C
Agitation: 8-blade (90 φ) turbine mixer, 1200 r.p.m., 5 seconds
Foaming scale, etc.: based on 150 g. polyether, cast in a 200 = mm =200 mm box and allowed to foam spontaneously.

The results of the experiment showed that satisfactory foams can be obtained with a small amount of foaming catalyst and that the foams have excellent physical properties.

EXAMPLE 8

A four-necked flask of 5,000 parts by volume of capacity equipped with a thermometer, reflux condenser and stirrer was charged with 700 parts by weight of monoethanolamine and externally heated to 100° C. To this was added 1,000 parts by weight of milled tolylenediisocyanate (80/20) distillation residue containing 13 % the monomer diisocyanate over a period of 30 minutes. After the addition of the distillation residue had been completed, the mixture was further stirred at 160° C for 2 hours. Analysis of the degradation product solution showed that it contained active hydrogen atoms corresponding to OH No. 1300 mg. KOH/g.

To the above the reaction mixture was added 60 parts by weight of potassium hydroxide and was introduced ethylene oxide at 110° to 120° C for 4 hours whereby 450 parts by weight of ethylene oxide was reacted. Propylene oxide was further introduced at the same temperature for 15 hours. During these periods, 2400 parts by weight of propylene oxide was reacted. The mixture was further stirred at 110° to 120° C for 1 hour and neutralized with 21.3 parts by weight of oxalic acid.

After two-hour aging of the reaction mixture at the same temperature, precipitated crystals were removed by filtration. Nitrogen gas was introduced to the filtrate at 100° to 120° C for 2 hours. The procedure provided 4400 parts by weight of a blackish brown liquid polyetherpolyol having OH No. 490 mg. KOH/g., pH 9.8 and viscosity of 13,600 cps at 25° C.

Table 2

| Experiment No. | | C-3 | C-4 | C-5 | C-6 | 7 | 8 | 9 | 10 | 11 | 12 | 13 |
|---|---|---|---|---|---|---|---|---|---|---|---|---|
| Formulation (weight part) | | | | | | | | | | | | |
| Control polyether 2 | | 100 | 100 | | | | | | | | | |
| Control polyether 3 | | | | 100 | 100 | | | | | | | |
| Polyether of Example 3 | | | | | | 100 | | | | | | |
| Polyether of Example 4 | | | | | | | 100 | | | | | |
| Polyether of Example 5 | | | | | | | | 100 | | | | |
| Polyether of Example 6 | | | | | | | | | 100 | 100 | | |
| Polyether of Example 7 | | | | | | | | | | | 100 | 100 |
| Silicone F-317 | | 1.5 | 1.5 | 1.5 | 1.5 | 1.5 | 1.5 | 1.5 | 1.5 | 1.5 | 1.5 | 1.5 |
| Water | | 1.5 | 1.5 | 1.5 | 1.5 | 1.5 | 1.5 | 1.5 | 1.5 | 1.5 | 1.5 | 1.5 |
| TMHDA*[1] | | 2.5 | 2.8 | 2.5 | 2.7 | 0.5 | 0.3 | 0.5 | 0.3 | 0.4 | 0.3 | 0.4 |
| Freon R-11 | | 36 | 41 | 35 | 39 | 32 | 36 | 35 | 35 | 40 | 35 | 39 |
| Millionate*[2] MR | | 158 | | 148 | | 134 | 158 | 151 | 153 | | 149 | |
| Takenate*[3] 4040 | | | 144 | | 136 | | | | | 140 | | 137 |
| Reactivity (seconds) | | | | | | | | | | | | |
| Cream time | | 17 | 13 | 18 | 12 | 18 | 13 | 20 | 17 | 13 | 22 | 20 |
| Gell time | | 73 | 76 | 70 | 75 | 70 | 55 | 75 | 57 | 75 | 75 | 98 |
| Rise time | | 98 | 128 | 95 | 130 | 93 | 77 | 105 | 73 | 125 | 106 | 137 |
| Appearance of foam | | Good | Good | Good | Good | Good | Good | Good | Good | Good | Good | Good |
| Physical properties | | | | | | | | | | | | |
| Density (Kg/m³) | | 27.5 | 24.8 | 26.8 | 24.6 | 27.3 | 25.8 | 26.8 | 26.4 | 24.2 | 27.7 | 23.8 |
| 10 % Compressive strength (Kg/cm²) | (//) | 1.85 | 1.95 | 1.75 | 1.90 | 1.90 | 1.85 | 1.74 | 1.75 | 2.10 | 1.90 | 1.90 |
| | (⊥) | 0.67 | 0.73 | 0.66 | 0.70 | 0.73 | 0.67 | 0.76 | 0.73 | 0.78 | 0.85 | 0.70 |
| Dimensonal change (%) | | | | | | | | | | | | |
| −30° C × 48 H | (//) | +0.1 | +0.15 | +0.25 | +0.15 | +0.05 | +0.1 | +0.05 | +0.1 | 0 | 0 | +0.1 |
| | (⊥) | −0.85 | −0.65 | −1.65 | −0.9 | −0.35 | −0.6 | −0.2 | −0.45 | −0.3 | −0.2 | −0.5 |
| 70° C × 48 H | (//) | −0.3 | −0.3 | −0.2 | −0.3 | −0.15 | −0.2 | −0.1 | −0.15 | −0.1 | −0.2 | −0.15 |
| | (⊥) | +1.15 | +0.9 | +1.35 | +1.05 | +0.4 | +0.55 | +0.4 | +0.6 | +0.1 | +0.45 | +0.35 |
| 50° C, 98% RH × 48 H | (//) | +0.5 | +0.8 | +0.5 | +0.6 | +0.1 | +0.35 | +0.1 | +0.6 | +0.35 | +0.7 | +0.80 |
| | (⊥) | +2.6 | +2.4 | +3.5 | +2.8 | +0.25 | −0.3 | +0.3 | −0.2 | −0.45 | −0.3 | −0.4 |
| Flammability (ASTM D 1692-59T) | | Burning 29 cm/min. | Burning 28 cm/min. | Burning 29 cm/min. | Burning 27 cm/min. | Self-extinguishing | Self-extinguishing | Self-extinguishing | Self-extinguishing | Burning 14 cm/min. | Burning 12 cm/min. | Burning 16 cm/min. |

*[1]N,N,N′,N′-tetramethylhexanediamine (foaming catalyst)
*[2]Crude MDI(amine equivalent 135), by Nippon Polyurethane Co., Ltd. in Japan)
*[3]Crude toluylene diisocyanate (amine equivalent 125), by Takeda Chemical Industries, Ltd.

EXAMPLE 9

According to a similar manner to that of Example 8, 800 parts by weight of milled tolylene diisocyanate distillation residue containing 13 % of the monomer diisocyanate was added to the mixture of 240 parts by weight of methatolylenediamine and 560 parts by weight of monoethanolamine and stirred for 3 hours at 160° C.

Analysis of the viscose liquid thus obtained showed that it contained active hydrogen atoms corresponding to OH No. 1390 mg. KOH/g.

To the liquid was dissolved 48 parts by weight of potassium hydroxide and then 500 parts by weight of ethylene oxide and 2,600 parts by weight of propylene oxide were reacted. After neutralization with 18.5 parts by weight of oxalic acid, the reaction mixture was treated according to the same manner as that of Example 8, whereby 4580 parts by weight of polyetherpolyol as blackish oily product. Analysis of the product showed that it had OH No. 430 mg. KOH/g., pH 9.6 and viscosity of 6,300 cps at 25° C.

REFERENCE EXAMPLE 3

By the introduction of propyleneoxide into a mixture of sucrose and diethyleneglycol (65:35 by weight), "Control polyether 4 having OH No. 430 was obtained.

The polyethers obtained in Examples 8 and 9 and Control polyether 4 were used respectively in combination with crude TDI (Takenate 4040) or curde MDI (Millionate MR) to obtain rigid polyurethane foams. The conditions of the experiments and appearances and physical properties of the polyurethane foams are summerized in Table 3.

Table 3

| Experiment No. | | C-7 | 14 | 15 | 16 | 17 | 18 | 19 |
|---|---|---|---|---|---|---|---|---|
| Formulation (weight part) | | | | | | | | |
| Control polyether 4 | | 100 | | | | | | |
| Polyether of Example 8 | | | 100 | 100 | 100 | 100 | | |
| Polyether of Example 9 | | | | | | | 100 | 100 |
| Surfactant (Silicon F-317) | | 1.5 | 1.5 | 1.5 | 1.5 | 1.5 | 1.5 | 1.5 |
| Water | | 1.5 | 1.0 | 1.5 | 1.5 | 2.5 | 1.5 | 2.5 |
| TMHDA | | 2.5 | 1.0 | 1.0 | 0.8 | 0.8 | 1.0 | 1.0 |
| Blowing agent (Freon R-11) | | 30 | 36 | 33 | 30 | 22 | 32 | 25 |
| Millionate MR(Crude MDI) | | 135 | 140 | 148 | | | 130 | 145 |
| Takenate 4040(Crude TDI) | | | | | 120 | 130 | | |
| Reactivity (second) | | | | | | | | |
| Cream time | | 16 | 17 | 15 | 15 | 15 | 16 | 15 |
| Gel time | | 74 | 65 | 63 | 65 | 68 | 88 | 90 |
| Rise time | | 105 | 100 | 92 | 110 | 107 | 133 | 101 |
| Apparence | | Good | Good | Good | Good | Good | Good | Good |
| Physical properties | | | | | | | | |
| Density (Kg/m³) | | 25.6 | 25.0 | 25.0 | 24.3 | 22.8 | 25.6 | 24.7 |
| 10 % compressive strength (Kg/cm²) | (//) | 1.95 | 2.13 | 2.06 | 2.10 | 1.84 | 2.02 | 2.08 |
|  | (⊥) | 0.55 | 0.67 | 0.63 | 0.69 | 0.58 | 0.55 | 0.53 |
| Dimensional change (%) | | | | | | | | |
| −30° C × 48 H | (//) | +0.41 | +0.01 | −0.13 | +0.26 | +0.14 | −0.10 | −0.04 |
|  | (⊥) | −2.35 | −0.58 | −0.98 | −1.24 | −0.65 | −0.56 | −0.50 |
| 70° C × 48 H | (//) | −0.6 | −0.26 | −0.42 | −0.13 | −0.24 | −0.39 | −0.33 |
|  | (⊥) | +3.7 | +0.58 | +0.36 | +0.24 | −0.11 | +0.35 | +0.08 |
| 50° C, 98% RH × 48 H | (//) | +1.0 | +0.08 | +0.45 | +0.18 | +0.17 | +0.66 | +0.74 |
|  | (⊥) | +4.3 | +0.90 | +0.07 | +0.34 | −0.23 | −0.21 | −0.73 |
| Flammability (ASTM D 1692-59T) | | Burning 28 cm/min. | Self-extinguishing | Self-extinguishing | Burning 15 cm/min. | Burning 16 cm/min. | Self-extinguishing | Burning 14 cm/min. |

What is claimed is:

1. A method for producing a polyetherpolyol consisting essentially of reacting
   A. compounds containing active hydrogen atoms, one third by weight to all of which is a reaction product obtained by reacting the distillation residue obtained in the distillation process of a crude organic diisocyanate produced by phosgenation of the corresponding organic diamine with
      1. at least a member selected from the group consisting of water, aliphatic alcohols having 1 to 10 carbon atoms and alkanolamines having 1 to 6 carbon atoms and
      2. a monoalkanolamine having 2 to 4 carbon atoms at a temperature ranging from 100° to 250° C with
   B. at least a member selected from the group consisting of ethylene oxide and propylene oxide.

2. A method according to claim 1, wherein the distillation residue contains not more than 30 weight % of an organic diisocyanate monomer.

3. A method according to claim 1, wherein the member (1) is an alkanolamine having 1 to 6 carbon atoms.

4. A method according to claim 1, wherein the members (1) and (2) are both monoethanolamine.

5. A method according to claim 1, wherein the distillation residue is one obtained from a crude tolylenediisocyanate or diphenylmethanediisocyanate.

6. A method according to claim 1, wherein the member (1) is water and the member (2) is monoethanolamine.

7. A method for producing a polyetherpolyol which consists essentially of reacting (A) compounds containing active hydrogen atoms, one third by weight to all of which is a reaction product obtained by reacting the distillation residue obtained in the distillation process of a crude organic diisocyanate produced by phosgenation of the corresponding organic diamine with
   1. at least a member selected from the group consisting of water, aliphatic alcohols having 1 to 10 carbon atoms and alkanolamines having 1 to 6 carbon atoms and 2. at least a member selected from the group consisting of the hydroxides and oxides of alkali or alkaline earth metals at a temperature ranging from 50° to 250° C, and then removing the carbonate of alkali or alkaline earth metal from the reaction mixture with (B) at least a member selected from the group consisting of ethylene oxide and propylene oxide.

8. A method according to claim 7, wherein the member (1) is an aliphatic alcohol having 1 to 10 carbon atoms and the member (2) is an alkali hydroxide.

9. A method according to claim 7, wherein the aliphatic alcohol is methylcellosolve and the alkali hydroxide is sodium hydroxide.

10. A polyetherpolyol which is obtained by the method of claim 1.

* * * * *